(12) United States Patent
Campbell et al.

(10) Patent No.: US 12,004,664 B2
(45) Date of Patent: Jun. 11, 2024

(54) ACCESS MANAGEMENT SYSTEM FOR WAREHOUSE RACK LOSS PREVENTION

(71) Applicants: Justin J. Campbell, Pecatonica, IL (US); Jeffrey A. Comstock, Edgerton, WI (US); Jeffery E. Dahl, South Beloit, IL (US)

(72) Inventors: Justin J. Campbell, Pecatonica, IL (US); Jeffrey A. Comstock, Edgerton, WI (US); Jeffery E. Dahl, South Beloit, IL (US)

(73) Assignee: Fasteners for Retail, Inc., Twinsburg, OH (US)

(*) Notice: Subject to any disclaimer, the term of this patent is extended or adjusted under 35 U.S.C. 154(b) by 375 days.

(21) Appl. No.: 17/212,948

(22) Filed: Mar. 25, 2021

(65) Prior Publication Data
US 2022/0304481 A1    Sep. 29, 2022

(51) Int. Cl.
| | |
|---|---|
| *A47F 1/12* | (2006.01) |
| *B65G 1/04* | (2006.01) |
| *G06K 7/10* | (2006.01) |
| *G06Q 20/18* | (2012.01) |
| *G06Q 20/20* | (2012.01) |
| *G07C 9/00* | (2020.01) |
| *G07F 11/60* | (2006.01) |

(52) U.S. Cl.
CPC .............. *A47F 1/12* (2013.01); *B65G 1/04* (2013.01); *G06K 7/10297* (2013.01); *G06Q 20/18* (2013.01); *G06Q 20/208* (2013.01); *G07C 9/00658* (2013.01); *G07F 11/60* (2013.01)

(58) Field of Classification Search
CPC ........ A47F 1/12; B65G 1/04; G06K 7/10297; G06Q 20/18; G06Q 20/208; G07C 9/00658; G07F 11/60
See application file for complete search history.

(56) References Cited

U.S. PATENT DOCUMENTS

2011/0127226 A1* 6/2011 Rataiczak, III ....... A47F 5/0093
                                                    221/221
2013/0257589 A1* 10/2013 Mohiuddin .............. G07C 9/28
                                                    340/5.61

FOREIGN PATENT DOCUMENTS

CN          210574086 U  *  5/2020
EP           1105024 B1  * 11/2003 ............... A47F 1/08

* cited by examiner

*Primary Examiner* — Florian M Zeender
*Assistant Examiner* — Joseph M Mutschler
(74) *Attorney, Agent, or Firm* — Reinhart Boerner Van Deuren P.C.

(57) ABSTRACT

A merchandise access system for a retail merchandise display is provided. The system includes a product support structure, a door and a brake. The product support structure defines a product storage area. The product storage area is formed between a front end and rear end of the product support structure. The door is transitionable between an open orientation in which selected product of the plurality of product can be removed from the product storage area and a closed orientation in which the plurality of product cannot be removed from the product storage area. The brake transitions between a braking position that prevents unselected product of the plurality of product from being moved towards the front end due to a biasing force and a release position in which the unselected product can move towards the front end due to the biasing force.

36 Claims, 13 Drawing Sheets

ACCESS MANAGEMENT SYSTEM FOR WAREHOUSE RACK LOSS PREVENTION

FIELD OF THE INVENTION

This invention generally relates to retail merchandise displays and systems for preventing theft or loss of retail merchandise.

BACKGROUND OF THE INVENTION

Retail theft is an ongoing problem in retail environments. As retail theft increases, retail profits decrease. As a result, retailers often times must increase the price of merchandise to maintain profitability. Accordingly, retail theft affects retailers and customers alike. Various loss prevention measures, including enhanced security and inventory monitoring have been employed in various retail environments and merchandise display systems to reduce retail theft.

Merchandise display systems are often configured such that the displayed product is towards the customer in a neat and organized manner. It is generally accepted that facing products can increase retail sales, and as a result, many retail stores now incorporate such self facing systems. One way to self-face products is to use slanted support surfaces so that gravity self-faces the products. Another way is the use of a pusher that pushes the products towards the front of the merchandise display system.

In self facing systems, as a leading item of merchandise is removed, the system biases the row (e.g. products) forward, so that the next item is now the leading item.

Unfortunately, thieves will often take a large number of products or a few very expensive products and flee the retail environment. If the thief can rapidly remove product from the merchandise display system, it makes it easier for the thief to make off with the desired product. One area of concern has become large, but expensive products such as vacuum cleaners.

The present disclosure provides examples of systems that inhibit or make it more difficult for thieves to remove product from the merchandise display system rapidly.

BRIEF SUMMARY OF THE INVENTION

The present disclosure includes new and improved merchandise display systems that limit access to merchandise.

In an example, a merchandise access system for a retail merchandise display includes a product support structure, a door and a brake. The product support structure defines a product storage area for holding a plurality of product to be dispensed. The product storage area is formed between a front end and rear end of the product support structure. The door is proximate the front end. The door is transitionable between an open orientation in which selected product of the plurality of product can be removed from the product storage area and a closed orientation in which the plurality of product cannot be removed from the product storage area. The brake is configured to transition between a braking position in which the brake prevents unselected product of the plurality of product from being moved towards the front end and a release position in which the unselected product can move towards the front end after the selected product has been removed from the storage area.

In one example, a biasing force is provided to bias the plurality of product towards the front end, the brake preventing the unselected product from moving towards the front end when in the braking position and allowing product to move towards the front end, due to the biasing force, when in the release position.

In one example, the product support structure defines a product support surface that supports the plurality of products within the product storage area. The product support surface is gravitationally higher proximate the rear end than proximate the front end of the storage area such that the biasing force is provided by gravity.

In one example, the brake extends into the product storage area in the braking position and is positioned out of the product storage area in the release position.

In one example, the product support structure defines a product support surface that supports the plurality of products. A product dispensing axis extends between the front end and rear end. The unselected product of the plurality of products moves towards the front end parallel to the dispensing axis after the selected product is removed from the product storage area. The door is pivotable about a pivot axis that is generally perpendicular to the product dispensing axis. The door includes a front wall against which the selected product is biased when the door is in the closed orientation. The door includes a bottom foot extending rearward from the front wall toward the rear end. The bottom foot is positioned substantially even with or vertically below the product support surface when the door is in the closed orientation. The bottom foot extending upward and at least in part above the product support surface when the door is in the open orientation.

In one example, the product support structure defines a product support surface that supports the plurality of products. A product dispensing axis extends between the front end and the rear end. The unselected product of the plurality of products moves towards the front end along the dispensing axis after selected product is removed from the product storage area due to the biasing force. The door is pivotable about a pivot axis that is generally perpendicular to the product dispensing axis. The door includes a front wall against which the selected product is biased when the door is in the closed orientation. The door includes a bottom foot extending rearward from the front wall. The bottom foot is positioned relative to the product support surface when the front wall is in the closed orientation such that the foot does not prevent unselected product positioned rearward of the foot from sliding past the rear most extent of the foot toward the front wall when the door is pivoted from the open orientation to the closed orientation after selected product has been removed.

In one example, the brake is operably coupled to the door such that as the door transitions from the closed orientation to the open orientation the brake transitions from the release position to the braking position.

In one example, the brake is operably coupled to the door by a mechanical linkage such that a load applied to the door that transitions the door from the closed orientation to the open orientation is used to drive the brake from the release position to the braking position.

In one example, the door is biased toward the closed orientation from the open orientation such that the door will automatically transition back to the closed orientation when the load is released from the door while in the open orientation.

In one example, the mechanical linkage has a base member fixed relative to the product support structure. The base member has at least one slot. The slot has a first end and a second end. The first end of the slot is closer to the product support surface than the second end. The mechanical linkage has a cam follower that is driven within the slot in a direction extending from the second end toward the first end to transition the brake from the release position to the braking position. The brake has a brake plate that is operably coupled to the cam follower. The cam follower driving the brake plate from being positioned substantially at or below the product support surface when the brake is in the release position to being positioned at a higher position and above the product support surface when the brake is in the braking position.

In one example, the slot is angled relative to the product support surface of the product support structure such that the door is closer to the first end of the slot than the second end of the slot.

In one example, an electronically actuated lock is provided that has a locked position operably acting on the door to prevent the door from transitioning from the closed orientation to the open orientation and an unlocked position wherein the door is permitted to transition from the closed orientation to the open orientation.

In one example, the electronically actuated lock is configured to permit the door to transition from the open orientation to the closed orientation when the electronically actuated lock is in the locked position.

In one example, the electronically actuated lock cooperates directly with a latch member fixedly attached to the door.

In one example, a sensor sends a signal to unlock the electronically actuated lock when access to the selected product is authorized. This authorization may occur when an authorized key is presented to the sensor. In some examples, the sensor is an RFID reader and the key is an RFID key.

In one example, a kiosk is operably coupled to the electronically actuated lock. The kiosk operably actuates the electronically actuated lock to the unlocked position when the kiosk receives an authorized access code.

In one example, the kiosk sends a signal to a controller of the electronically actuated lock to actuate the electronically actuated lock.

In one example, the kiosk is configured to process payment information from a customer. The kiosk is configured to actuate, operably, the electronically actuated lock when the payment information has been accepted.

In one example, the kiosk includes a bar code reader and the access code is in the form of a bar code.

In one example, the sensor is an RFID sensor.

In one example, the electronically actuated lock can be actuated to the unlocked position using an app on a mobile device. In some examples, the app can receive an access code, such as an access code provided to a sales clerk. In some examples, the app can process payment information and then, when accepted, operably actuate or be used to actuate the electronically actuated lock.

In one example, the product support structure is configured to bias the plurality of product towards the door.

In one example, the product support structure defines a product support surface that supports the plurality of product. The product support surface has a first portion extending parallel to a product dispensing axis extending between the front end and the rear end. The product support surface has a second portion extending parallel to the product dispensing axis. The first and second portions of the product support surface are laterally spaced apart from one another along a transverse axis being perpendicular to the product dispensing axis. The brake is positioned between the first and second portions of the product support surface.

In one example, the product support structure defines a product support surface that is defined by a plurality of rollers.

In an example, a retailer merchandise display including a plurality of product and a merchandise access system is provided. The plurality of product is positioned within the product storage area. Each product of the plurality of product has a product depth measured parallel to the dispensing axis between a front and a rear of the product. The foot extends rearward from the front wall to a distal end a foot depth measured parallel to the dispensing axis. The foot depth is less than the product depth. As such, when the front of the product abuts the front wall, the rear of the product is spaced rearward from the front wall farther than the distal end of the foot such that the product extends rearward farther than the foot such when the door transitions from the closed orientation to the open orientation the foot pivots clear of any product that is abutted against the rear of the product that is abutted against the front wall.

In an example, a retailer merchandise display including a plurality of product and a merchandise access system is provided. The plurality of product is positioned within the product storage area. Each product of the plurality of product has a product depth measured parallel to the dispensing axis between a front of the product and a rear of the product. The foot extends rearward from the front wall to a distal end of the foot a foot depth measured parallel to the dispensing axis. The foot depth is less than the product depth such that only one product of the plurality of product may be located in a region of the product storage area vertically above the foot between the distal end and the front wall.

In one example, the center of gravity of the product positioned proximate the foot is located between the front wall and the distal end of the foot such that the product proximate the front wall pivots with the door when the door pivots from the closed orientation to the open orientation.

In an example, a method of removing selected product from a plurality of product stored within a merchandise access system as outlined above is provided. The method includes transitioning the door to the open orientation; removing the selected product from the product storage area; and preventing the unselected product of the plurality of product from being moved towards the front end due to a biasing force biasing the plurality of product towards the front end by transitioning the brake to the braking position.

In one example, the method includes transitioning the door from the open orientation to the close orientation and indexing the unselected product towards the front end due to the biasing force by transitioning the brake to the release position.

In one example, the step of the plurality of product from being moved towards the front end includes vertically lifting at least a portion of a bottom of at least one product of the unselected product off of the product support structure. The step of allowing the unselected product to move towards the front end includes vertically releasing the vertically lifted product such that is disengaged from the brake.

In one example, the method includes actuating an electronically actuated lock from a locked position preventing the door from transitioning from the closed orientation to the open orientation to an unlocked position wherein the door is permitted to transition from the closed orientation to the open orientation.

In one example, the method includes receiving an access authorization code and then performing the step of actuating the electronically actuated lock from the locked position to the unlocked position.

In one example, the access authorization code is received by a kiosk that is at a remote location.

In one example, the method includes receiving an access authorization signal and then performing the step of actuating the electronically actuated lock from the locked position to the unlocked position.

In one example, the access authorization signal is received by a sensor sensing a key in proximity of the sensor. In a particular example, the sensor is an RFID sensor and the key is an RFID key.

In one example, the method includes receiving payment information and then performing the step of actuating the electronically actuated lock from the locked position to the unlocked position.

In one example, the method includes returning the door to the closed orientation. The method includes allowing unselected product to transition into being selected product. The method includes transitioning the door, for a second time. The electronically actuated lock remains in the unlocked position while the door is transitioned the open orientation both times.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
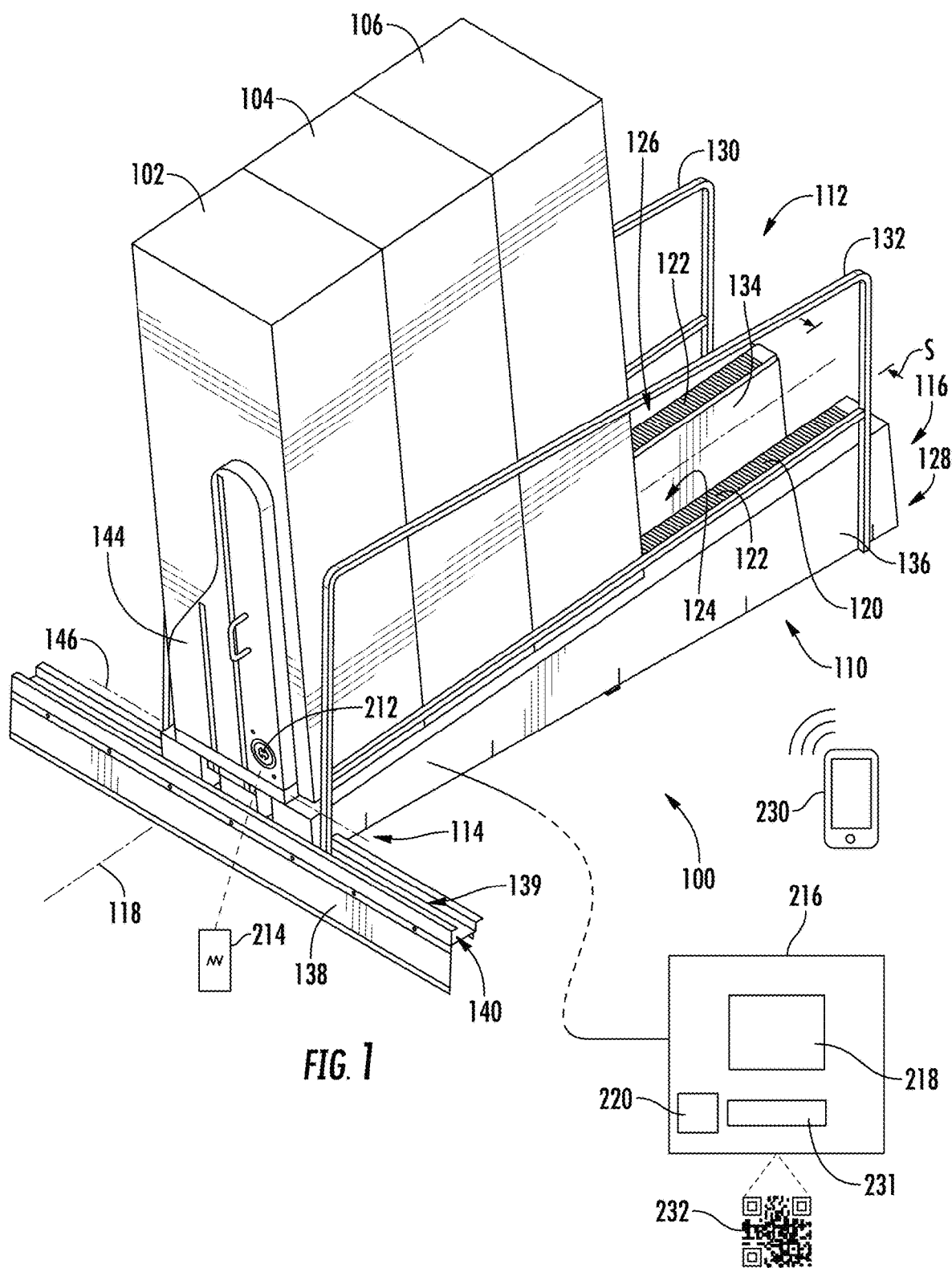
FIG. 1 is a perspective illustration of a merchandise display system according to an example of the disclosure having product therein with the door thereof in a closed orientation.
Figure 2:
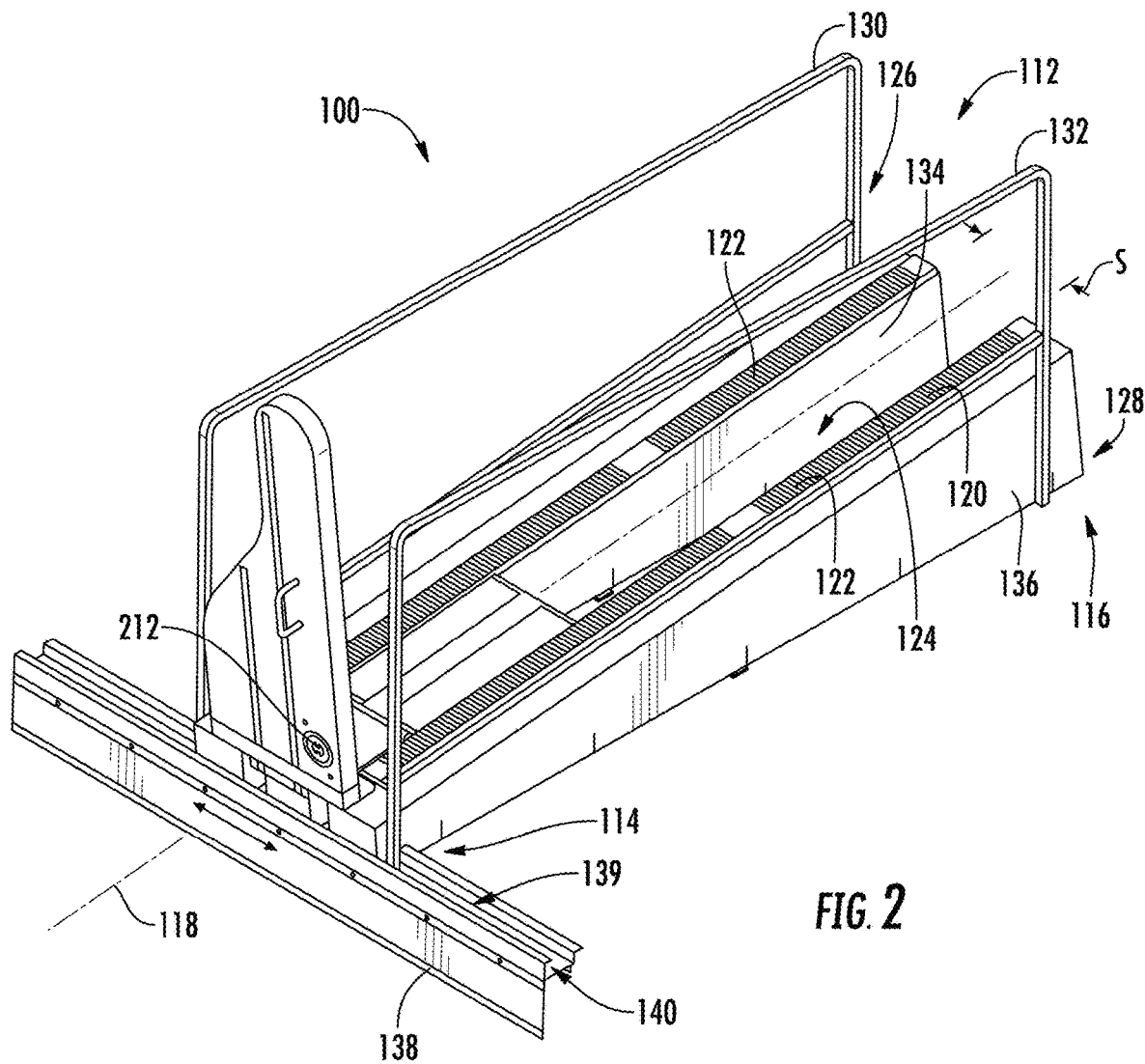
FIG. 2 is a perspective illustration of a merchandise display system according to an example of the disclosure having product removed with the door thereof in a closed orientation.

FIG. 1 illustrates a merchandise access system in the form of a merchandise display system 100 for securely holding and displaying a plurality of products such as in a retailer merchandise establishment. The merchandise display system 100 can be its own standalone system or can be mounted on existing shelving, racks or other support structures used in retailer merchandise establishments. Products 102, 104, 106 are loaded in the merchandise display system 100 in FIG. 1. The illustrated example finds particular use with large retail products such as upright vacuum cleaners. However, the concepts and systems disclosed herein are useful for many different sized product.

The merchandise display system 100 includes a product support structure 110 that defines a product storage area 112 in which the products 102, 104, 106 are held and from which they can be selectively dispensed.

The product storage area 112 is generally defined between a front end 114 and a rear end 116 of the product support structure 110. A dispensing axis 118 generally extends between the front end 114 and rear end 116.

In this example, the product support structure 110 defines a product support surface 120 upon which the products 102, 104, 106 rest. In this example, the product support surface 120 is provided by arrays of rollers 122. However, in other embodiments, the product support surface 120 could be provided by more or fewer arrays of rollers 122. In this example, the rollers 122 rotate about axes that are perpendicular to the dispensing axis 118.

In this example, two arrays of rollers 122 are provided and they are laterally spaced outward away from one another along an axis that is perpendicular to the dispensing axis 118 forming a gap 124 therebetween. In other examples, the product support surface 120 could simply be formed by one or more flat surfaces and need not include rollers. In further examples, ball bearing supports that can rotate about more than one axis could be used.

It is preferred that the product support structure 110 is configured such that the products 102, 104, 106 stored therein are biased toward the front end 114. In this example, the product support surface 120 is vertically slanted in a downward direction when moving from the rear end 116 towards the front end 114. As such, gravity biases the products 102, 104, 106 towards the front end 114.

In other examples, pushers could be used to push the products 102, 104, 106 towards the front end.

In this example, the product support structure 110 includes a pair of adjustable side members 126, 128. In this example, each side member 126, 128 includes one of the arrays of rollers 122. In addition to the arrays of rollers 122 each side member 126, 128 includes a divider 130, 132 to help laterally support the products 102, 104, 106. In this example, the dividers 130, 132 define that lateral extent of the product storage area 112.

In this example, each side member 126, 128 includes a base member 134, 136 to which the corresponding divider 130, 132 and corresponding array of rollers 122 is attached. In this example, the spacing S of the side members 126, 128 is adjustable perpendicular to dispensing axis 118 to adjust the width of the product storage area such that different width products 102, 104, 106 can be accommodated.

Figure 6:
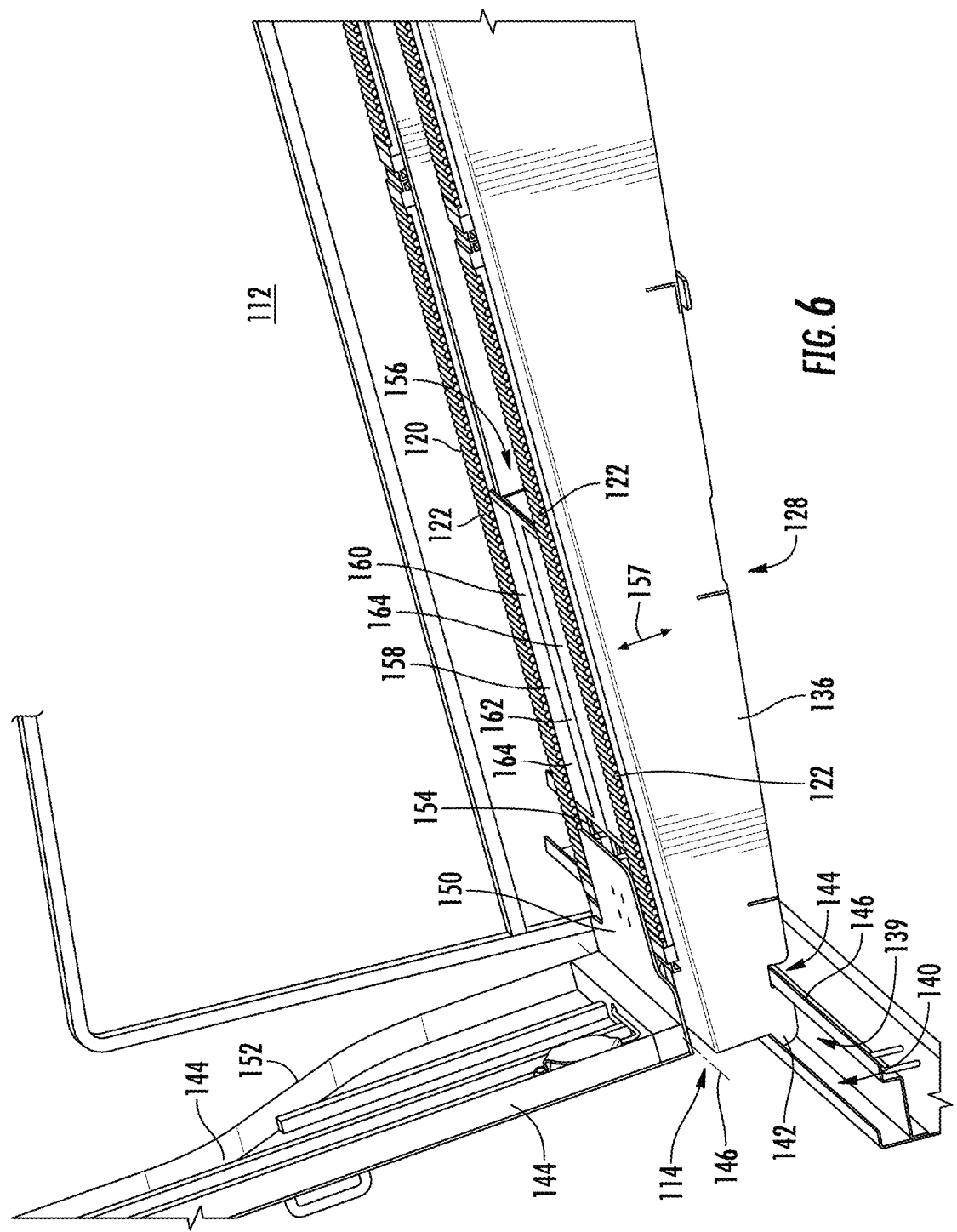
FIG. 6 is a partial perspective illustration of a merchandise display system according to an example of the disclosure having product removed with the door thereof in a closed orientation.
Figure 7:
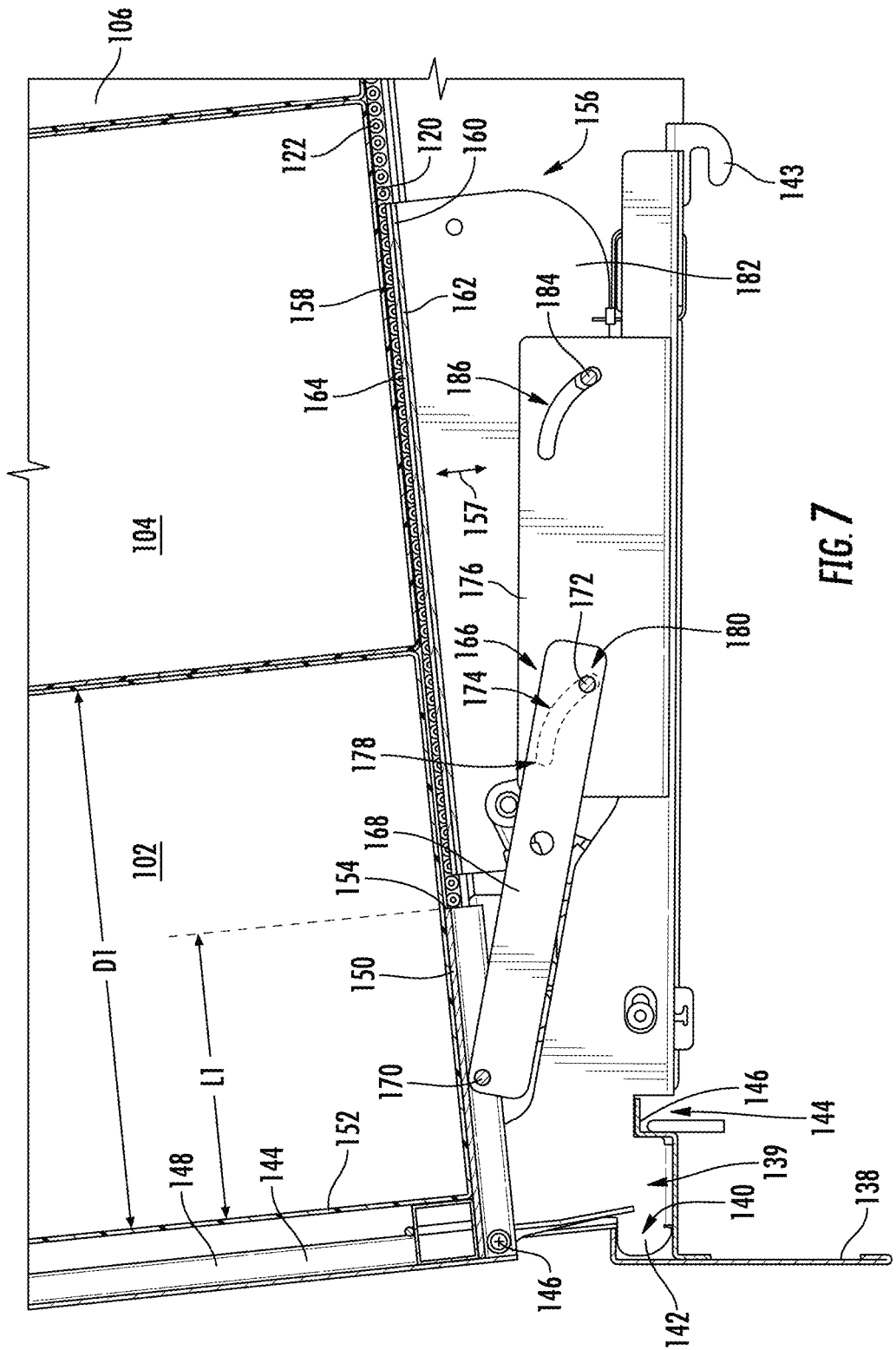
FIG. 7 is a partial cross-sectional illustration of the brake and door of the merchandise display system with product stored therein and the door in the closed orientation.

The base members 134, 136 are attached proximate the front end 114 to a front mounting rail 138. The front mounting rail 138 can provide lateral stability to the base members 134, 136. The front mounting rail 138 includes a channel 139 that runs along the length of the front mounting rail 138. With additional reference to FIGS. 6 and 7, the channel 139 has an undercut region 140 that receives a tab 142 of the base members 134, 136. The base members 134, 136 also include a cutout region 144 that receives upstanding wall 146. Wall 146 can form part of channel 139. These mating features helps lock the base members 134, 136 to the front mounting rail 138.

Again, the base members 134, 136, in this example, can be mounted substantially at any axial position along the front mounting rail 138 so as to configure the size of the product storage area 112 to the product being stored.

The mounting rail 138 may be mounted to shelving or rack units.

Additional connection features positioned rearward of the mounting rail 138 may be incorporated to help secure the system 100 to a support structure. For example, hooks 143 may be incorporated that can help secure the system to a support structure, such as the decking of shelving or wire of a rack unit.

A door 144 is positioned proximate the front end 114. The door 144 provides selective access to the product storage area 112.

In this example, the door 144 is pivotably mounted for pivoting motion about door axis 146, which is perpendicular to product dispensing axis 118. However, a sliding door or a door that pivots about a different axis is contemplated.

Figure 3:
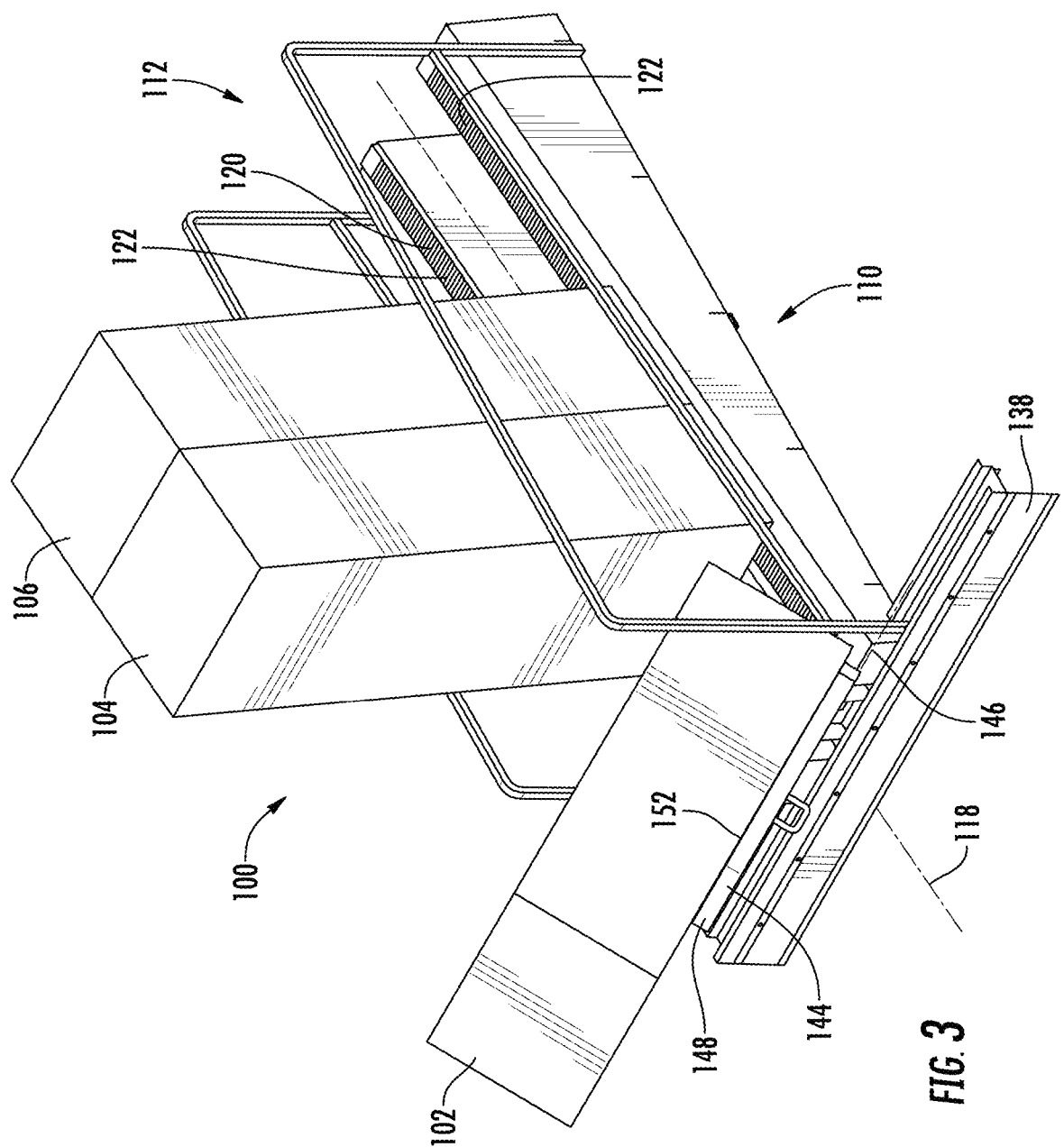
FIG. 3 is a perspective illustration of a merchandise display system according to an example of the disclosure having product therein with the door thereof in an open orientation.

FIG. 1 illustrates door 144 in a closed orientation and FIG. 3 illustrates door 144 in an open orientation in which access to the product storage area 112 is permitted. When the door 144 in the closed orientation, the forward most product, e.g. product 102, abuts against a rear side 152 of the door 144 and product is prevented from being removed.

In the present configuration, when the door is in the open orientation, only selected product(s) are able to be removed from the product storage area 112. In this configuration and with products 102, 104, 106 loaded therein, only product 102 is a selected product that can be removed from the product storage area 112.

Figure 4:
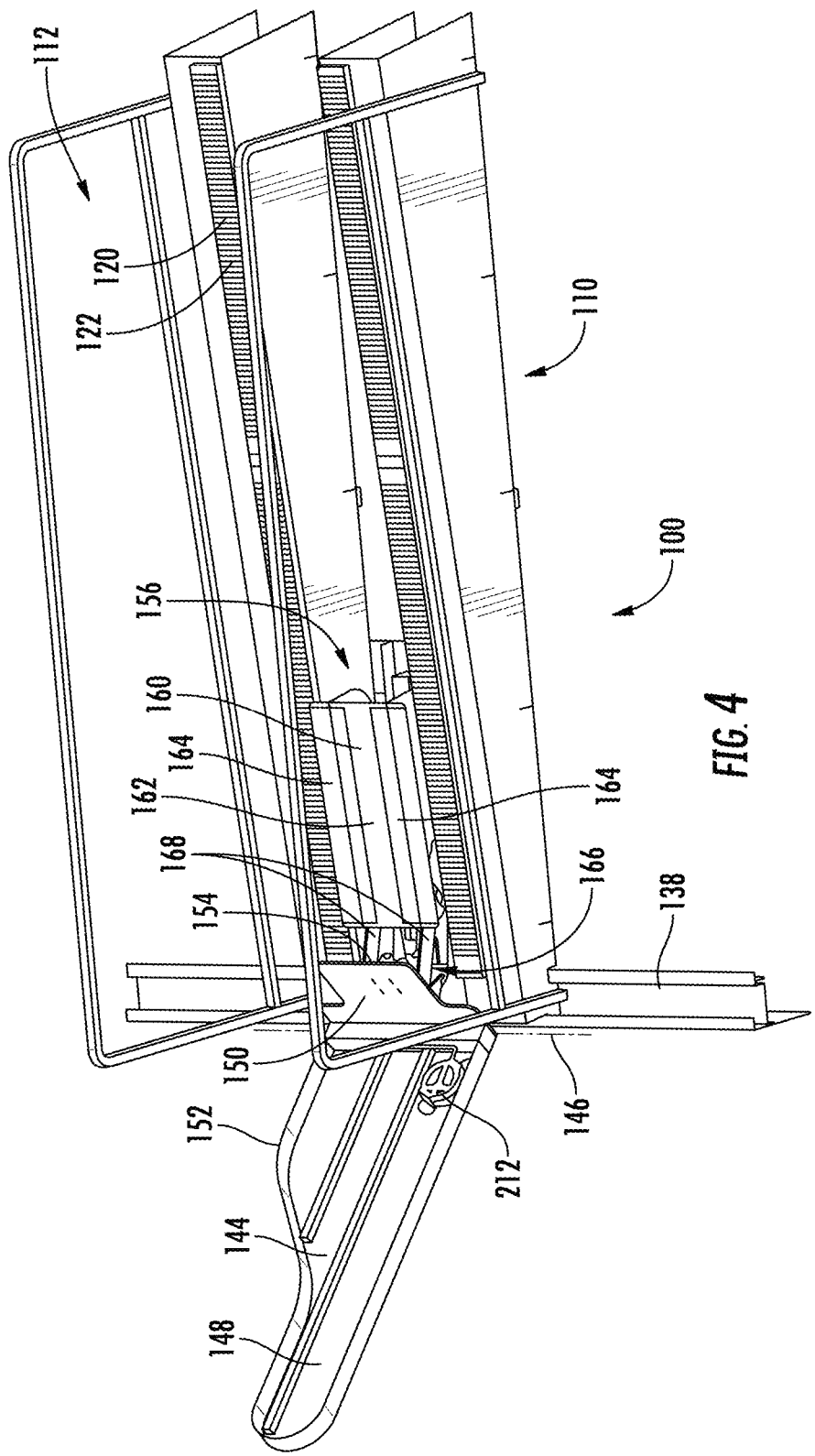
FIG. 4 is a perspective illustration of a merchandise display system according to an example of the disclosure having product removed with the door thereof in an open orientation.

With additional reference to FIG. 4, the door 144 includes a front wall 148 and a foot 150. The foot 150 extends rearward from a rear side 152 of the front wall 148. The front wall 148 and foot 150 form an L-shape in this example.

When the door 144 rotates from the closed orientation to the open orientation, the toe 154, e.g. rear most extent, of the foot 150 moves vertically upward as it rotates about axis 146. This action assists in tilting the selected product, e.g. product 102 in FIG. 3, making it easier for a user to grasp and remove the selected product from the product storage area 112. The selected product (e.g. product 102 in the drawings) will rest against the rear side 152 of the door 144 until removed by the user.

Figure 5:
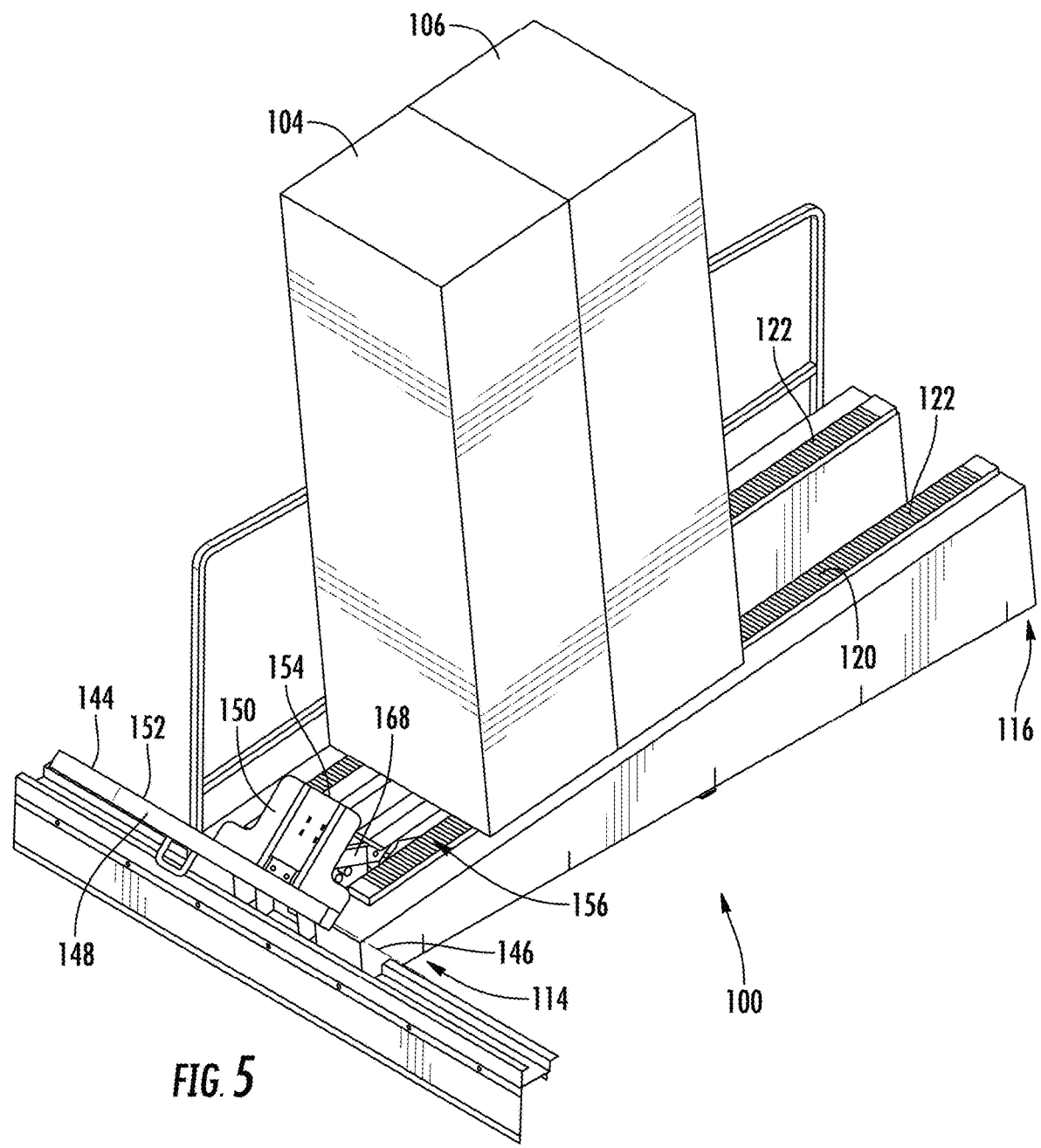
FIG. 5 is a perspective illustration of a merchandise display system according to an example of the disclosure having product therein with the door thereof in an open orientation and with a selected product removed.

With reference to FIG. 5, with the door 144 in the open orientation, the product 102 has been removed. It is a feature of examples of the system 100 that the unselected product, e.g. products 104 and 106, are prevented from moving towards the front end 114, e.g. towards door 144, when the door 144 is in the open orientation.

A brake 156, illustrated in FIG. 4, is configured to prevent the unselected product 104, 106 from moving toward the front end 114. The brake 156 transitions (see arrow 157) between a braking position (FIG. 4) that prevents movement of the unselected products 104, 106 toward door 144 and a release position (FIG. 6) to allow the unselected products 104, 106 to move forward towards door 144.

More particularly, the brake 156 is configured to overcome any biasing force acting on the unselected products 104, 106 biasing the products 104, 106 towards the front end 114 and door 144 (e.g. gravitational forces or any other biasing forces such as by way of a pusher).

In some embodiments, the brake 156 is configured to prevent users from accessing the unselected products 104, 106. As such, this can limit or inhibit theft or sweeping of product from the merchandise display system 100.

In the release position (FIG. 6), a top 158 of a brake plate 160 of the brake 156 is positioned vertically below the product support surface 120. Thus, the brake plate 160 does not engage or otherwise interfere with the movement of the unselected products along the dispensing axis 118 towards door 144 and front end 114. This vertical offset between the top 158 of the brake plate 160 and the product support surface 120 (illustrated by a bottom of product 104 or top of rollers 122) is further illustrated in FIGS. 7 and 8. In this example, the brake plate 160 is a composite structure including a main plate 162 and a plurality of gripping members 164, e.g. a high grip urethane foam or other high grip material. In other examples, the top surface of main plate 162 could simply have a textured to improve gripping action thereof.

Figure 9:
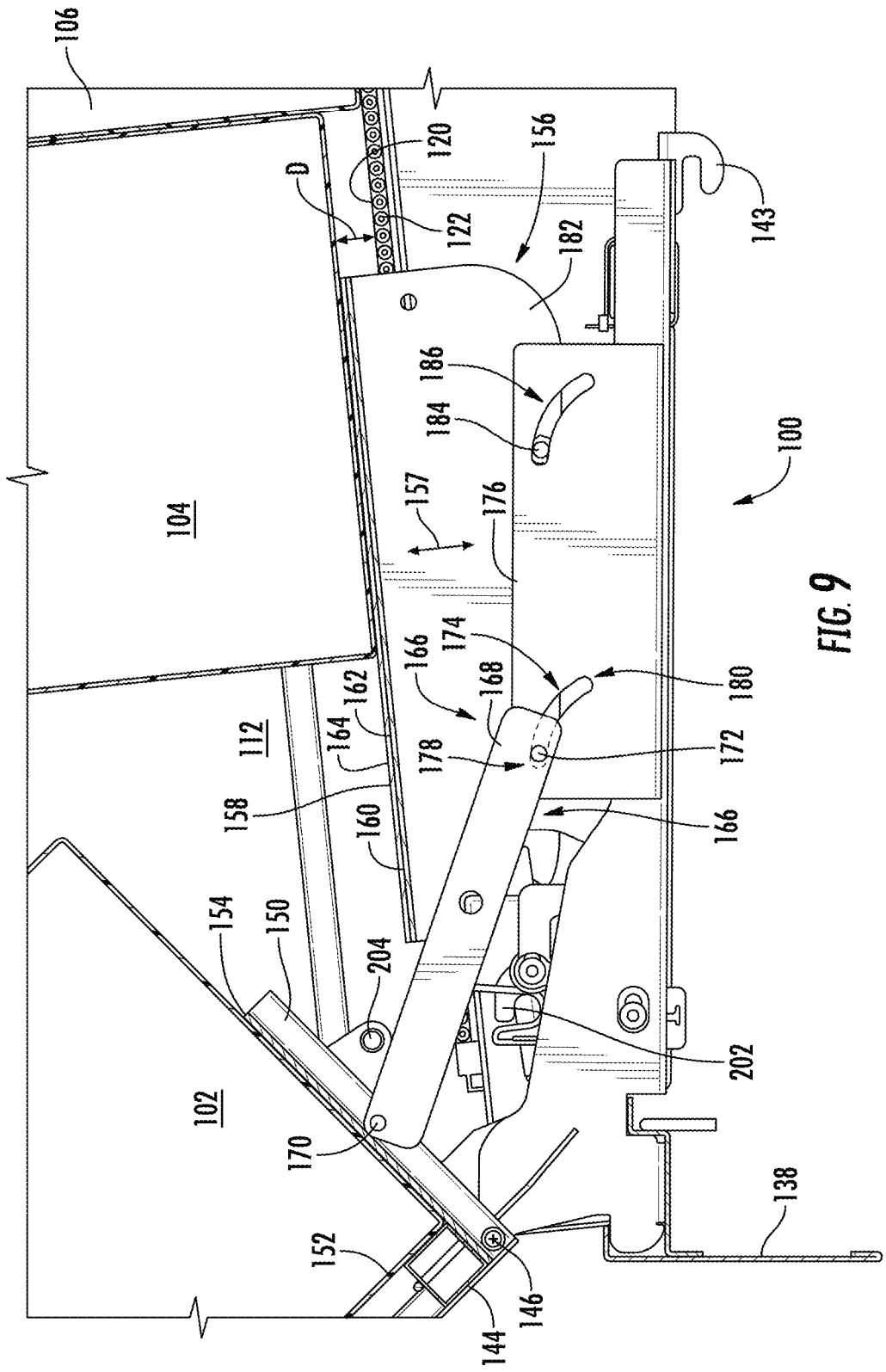
FIG. 9 is a partial cross-sectional illustration of the brake and door of the merchandise display system with product stored therein and the door in the open orientation showing the linkage between the door and the brake.

With reference to FIG. 9, in the braking position (FIGS. 4, 5, and 9), at least a portion of the top 158 of the brake plate 160 has been driven vertically above the product support surface 120 and into the product storage area 112. This is illustrated by the distance D in FIG. 9 between a bottom of product 104 which rests on the top 158 of gripping member 164 and the top of the rollers 122.

Figure 10:
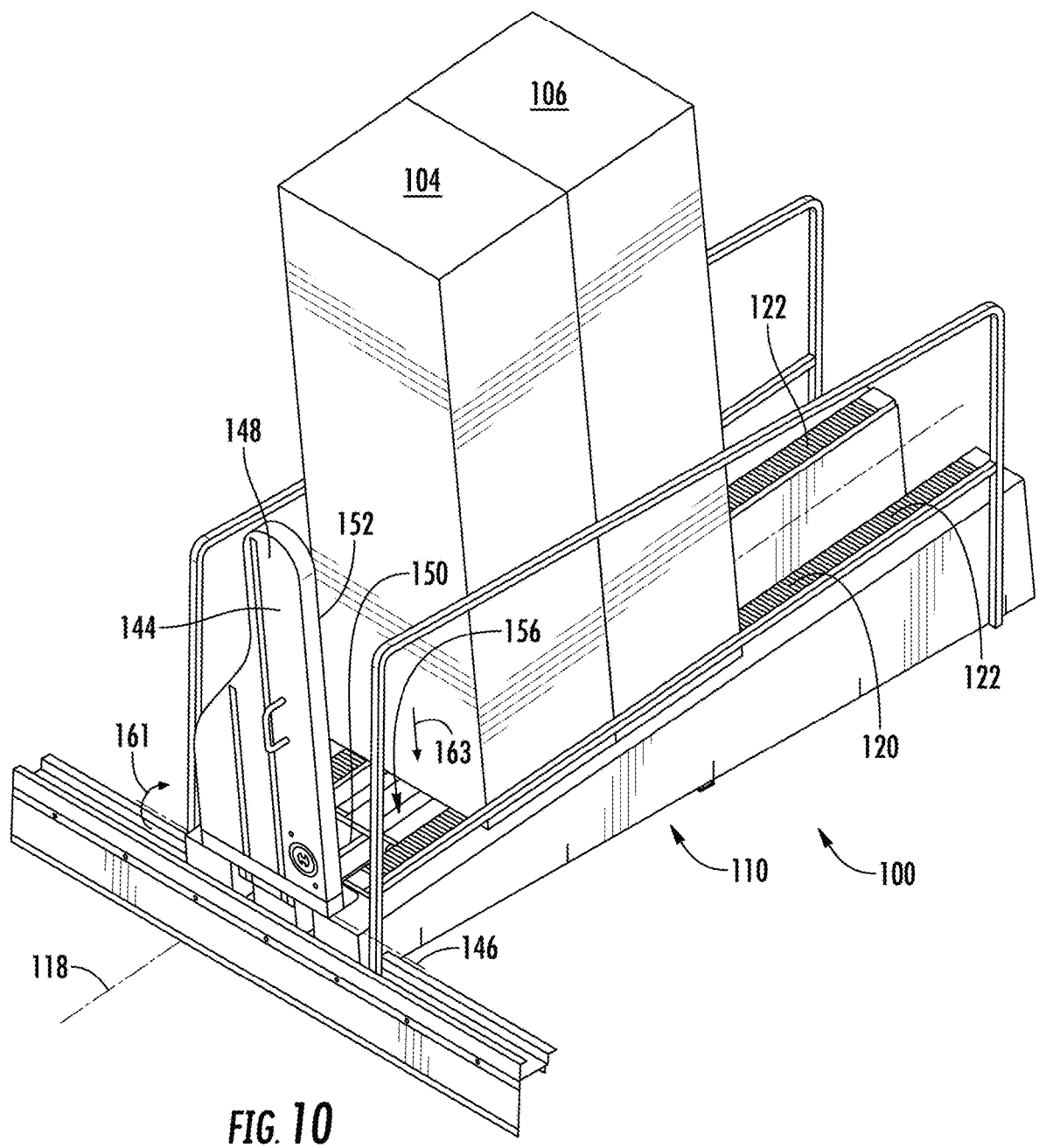
FIG. 10 is a perspective illustration of a merchandise display system according to an example of the disclosure having product therein with the door thereof in the closed orientation and with a selected product removed prior to indexing of the unselected product.
Figure 11:
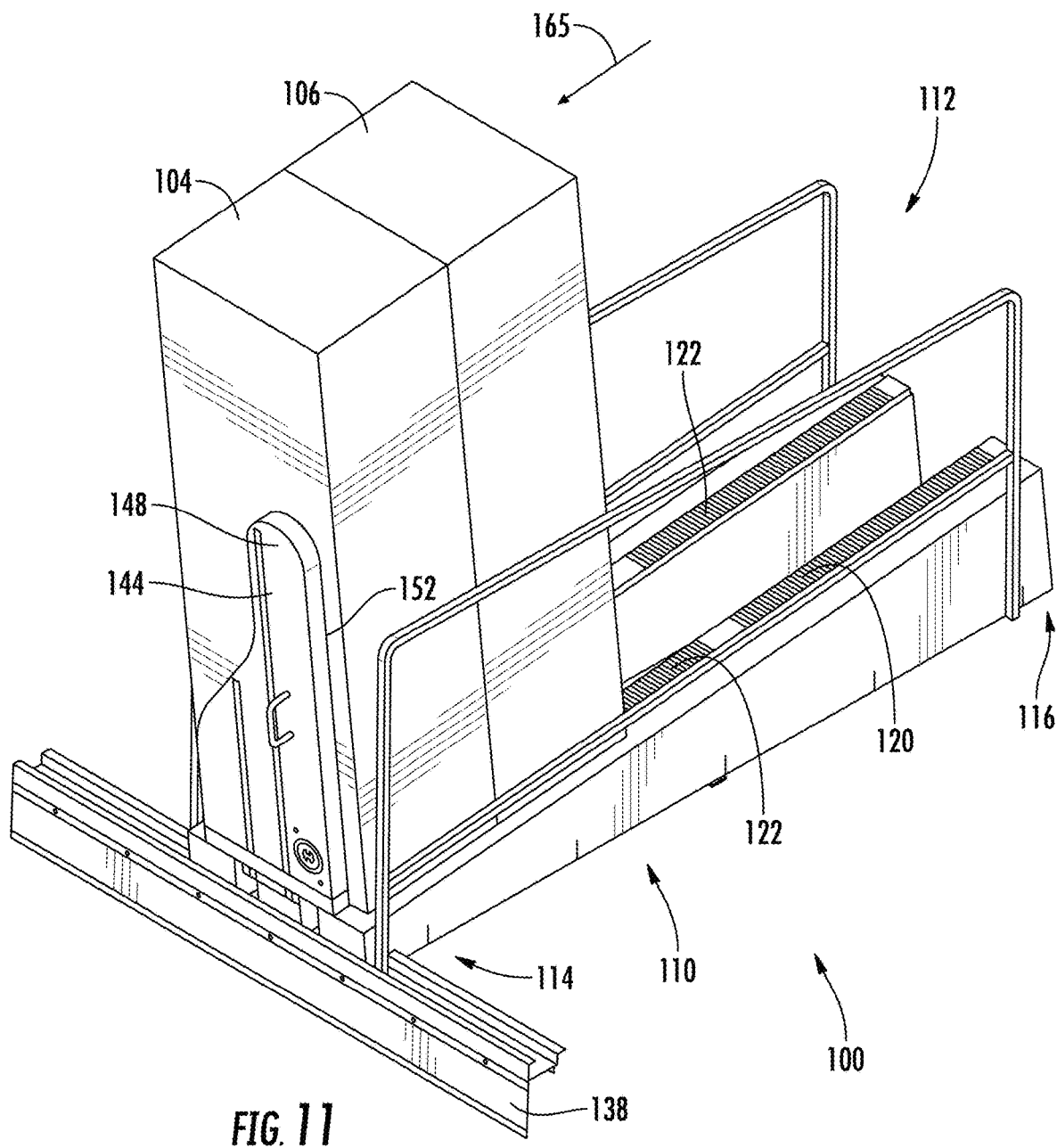
FIG. 11 is a perspective illustration of a merchandise display system according to an example of the disclosure having product therein with the door thereof in the closed orientation and with the unselected product indexed toward the door.

FIG. 10 illustrates the door 144 returned to the closed orientation and the brake 156 returned to the release position (illustrated by arrows 161 and 163). In this configuration, the unselected products 104, 106 are released by the brake 156 and allowed to move along the dispensing axis 118 until product 104 abuts rear side 152 of door 144 as illustrated in FIG. 11 by arrow 165.

In the release position, the top 158 of the brake plate 160 at toe 154 is preferably vertically below product support surface 120. However, it is permissible for the top 158 of toe 154 to be at or slightly above the product support surface 120 as long as its position does not prohibit product 104, 106 from sliding past toe 154 and into abutment with wall 148 or at least into the position of product 102 prior to removal.

Consequently, product 104 now becomes the selected product as it will be the next product dispensed, when so desired.

While the brake 156 described above pushes vertically upward on the first item of the unselected product, other brakes could include a gate member (e.g. a panel) that slides between the selected and unselected products (e.g. between objects 102 and 104 in FIG. 1). The unselected products 104, 106 would remain behind or otherwise secured in the product storage area 112 such that they cannot be accessed.

As illustrated in FIG. 9, in one example, but not all, when the door 144 is in the open condition, the toe 154 is positioned vertically above the product support surface 120.

The brake 156, in this example, is operably coupled to the door 144 such that when the door 144 is transitioned between the closed orientation and the open orientation, the brake 156 is simultaneously transitioned from the release position to the braking position.

A mechanical linkage 166 is operably coupled between the door 144 and the brake 156 to facilitate the coordinated operation of the brake 156 with manipulation of the door 144. More particular, when an external load, such as by a user, is applied to the door 144 to transition from the closed position to the open position, the load also transitions the brake 156 from the release position to the braking position.

In this example, the mechanical linkage 166 includes a pair of laterally spaced apart linking bars 168 pivotally connected to the door 144 and particularly to foot 150 by pin 170. At an opposed end, the linking bars 168 are connected to a cam follower, in the form of pin 172. The pin 172 slides in slots 174 formed in a base member 176 that is fixed relative to the product support structure 110. The base member 176 in this example is provided by a pair of laterally spaced apart upstanding walls. In this example, the pair of upstanding walls are positioned in between the opposed spaced apart linking bars 168 however other configurations are clearly contemplated (few or more linking bars and fewer or more upstanding walls with different lateral spacing).

The slots 174 have first and second ends 178, 180. The first end 178 is vertically closer to the product support surface 120 than the second end 180 such that as the pin 172 slides towards the first end 178 from the second end 180 as the door 144 is driven from the closed orientation to the open orientation (e.g. the transition from FIG. 7 to FIG. 9) is driven vertically, at least in part, upward. In this example, the pin 172 is driven towards product support surface 120.

In addition to sliding in slots 174 and being connected to linking bars 168, the pin 172 is connected to the brake plate 160. In this example, the brake plate 160 has two sidewalls 182 that are laterally outward of linking bars 168. The pin 172 extends through apertures in the sidewalls 182 such that the pin 172 can rotate relative to the sidewalls 182 but cannot otherwise significantly move relative to the sidewalls 182. Thus, as pin 172 is moved upward relative to the product support surface 120 as it moves within slots 174, the sidewalls 182 and the rest of brake plate 160 are similarly moved vertically upward.

A second pin 184 extends through the sidewalls 182 and corresponding slots 186 in the base member 176. Slots 186 and 174 are sized and shaped the same such that pins 172 and 184 have a similar motion profile when moving within the corresponding slots 174, 186. This for a more uniform vertical motion of the brake 156 when transitioning between the braking and release positions as illustrated by arrow 157.

In this example, slots 174, 186 also have a front-to-back component such that the first end 178 is closer to the front end 114 than the second end 180.

Figure 8:
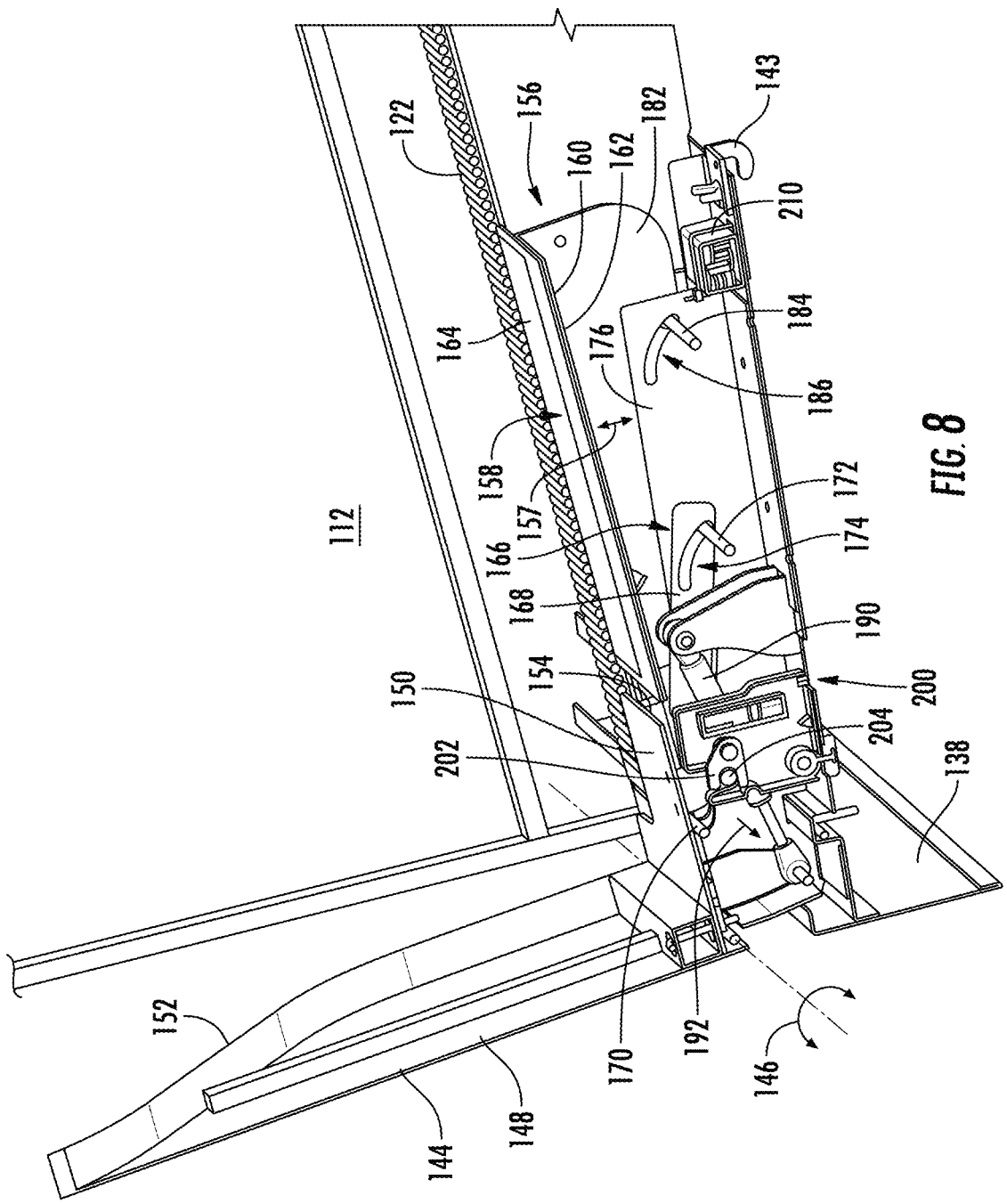
FIG. 8 is a cross-sectional, perspective illustration of a merchandise display system according to an example of the disclosure having product removed with the door thereof in a closed orientation.
Figure 12:
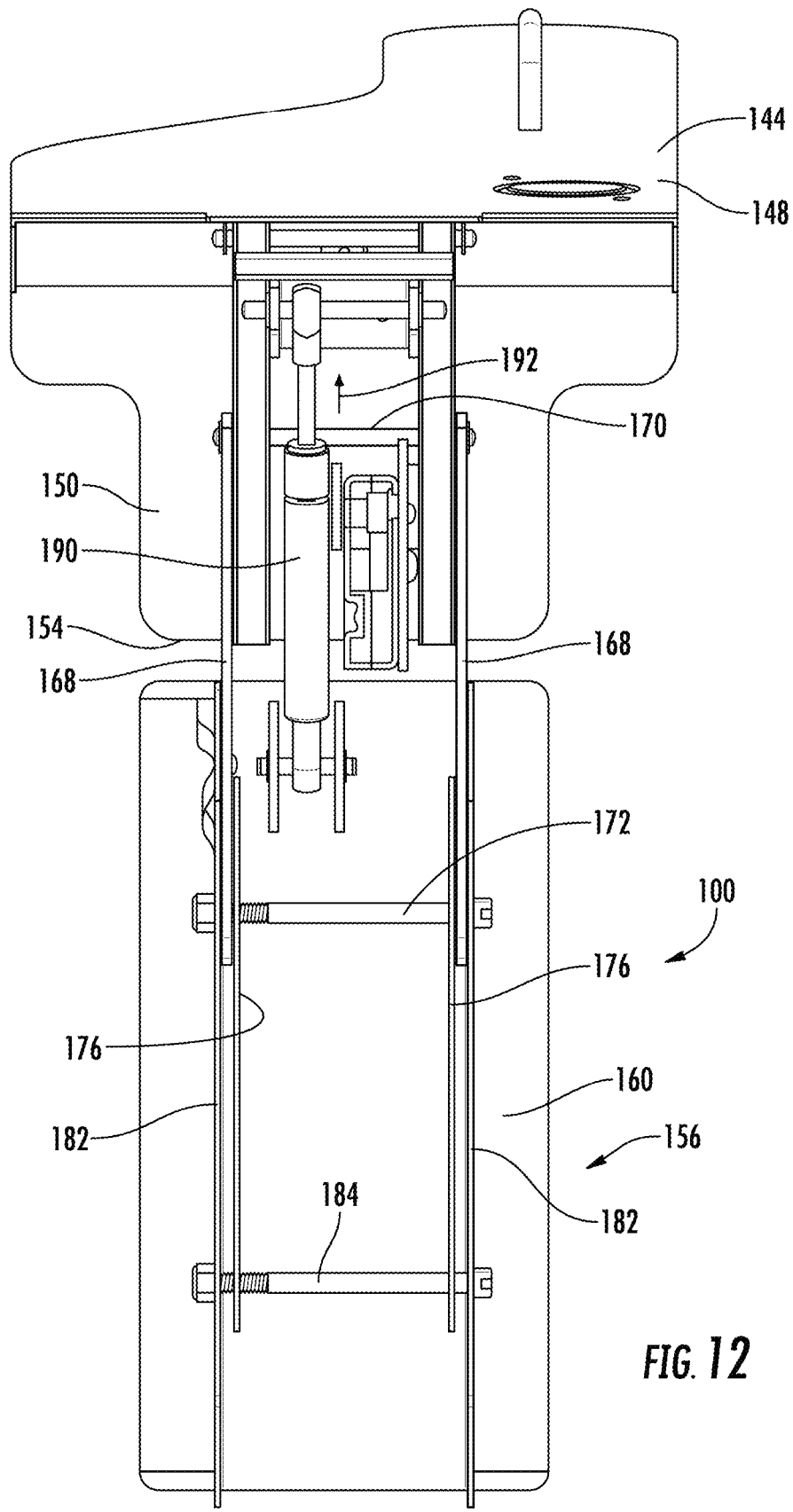
FIG. 12 is a bottom cross-sectional illustration of the brake and door of the merchandise display system.

A biasing member in the form of an air cylinder 190 provides a biasing force 192, illustrated by arrow 192 in FIGS. 8 and 12, that biases the door 144 towards the closed orientation. As such, when a user releases the load on the door 144 holding the door 144 in the open orientation, the door 144 will automatically transition to the closed orientation. This will also automatically transition the brake 156 to the release position.

Other biasing members, including but not limited to spring members or weights, are contemplated.

In other embodiments, the door may be electronically coupled to the brake. As such, electronic actuators can drive the brake between the braking position and the release position when the door transitions between the open orientation and the closed orientation. A motion sensor could be coupled to the door to send a signal to the electronic actuator to appropriately drive the brake. The motion sensor could be an encoder, laser or other motion detection device.

Figure 13:
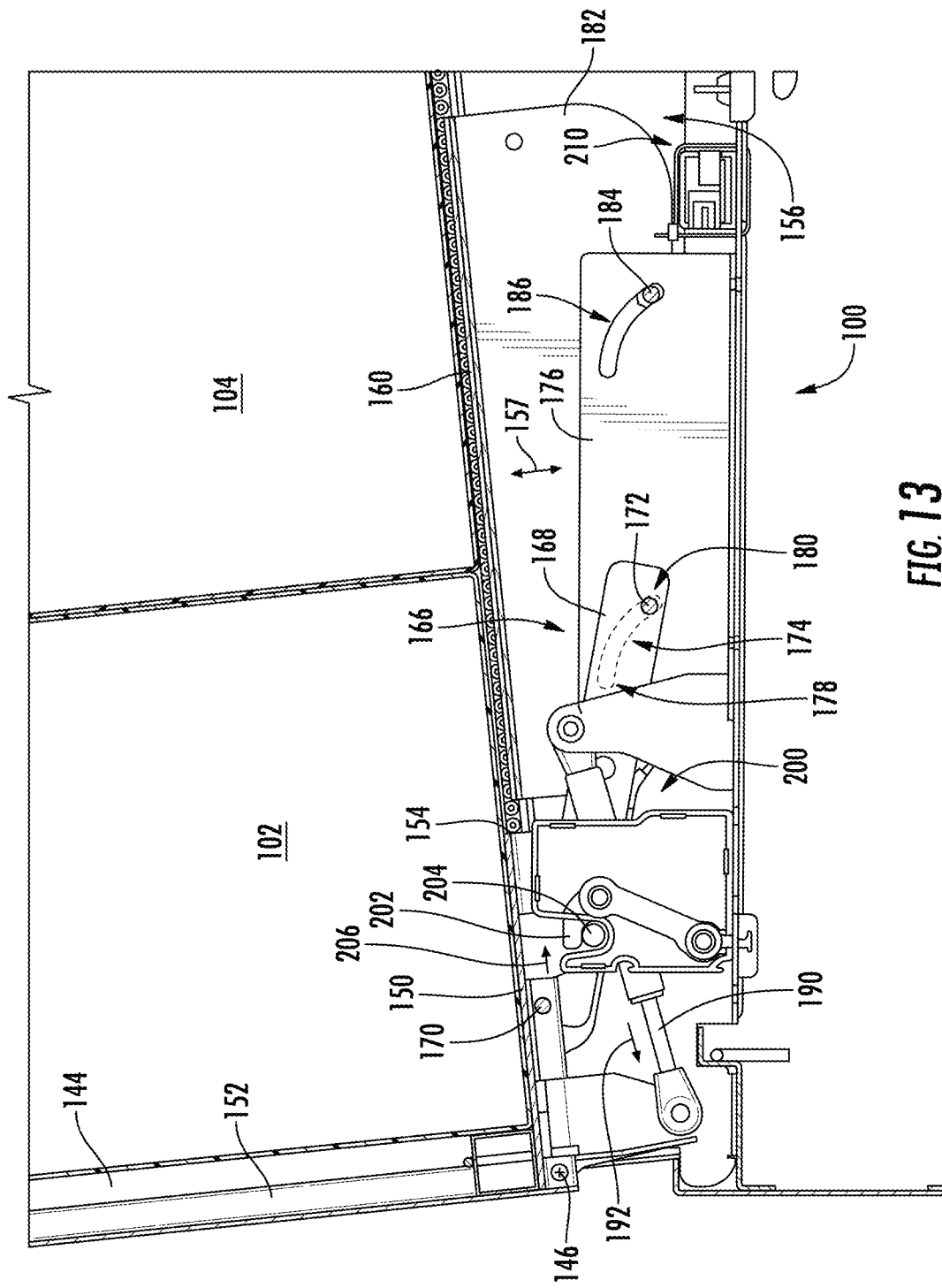
FIG. 13 is a cross-sectional illustration of the door and brake area of the merchandise display system with the door in a closed orientation and showing the lock thereof.

With reference to FIG. 13, a locking mechanism 200 (also referred to as a lock 200), when in a locked position, prevents manipulation of the door 144 from the closed orientation to the open orientation when unauthorized. In this example, the locking mechanism 200 is an electronically actuated lock (e.g. it is unlocked electronically). However, manual locking mechanisms are contemplated. In some configurations, the lock mechanism 200 is configured to permit the door 144 to transition from the open orientation fully back to the closed orientation even when the locking mechanism 200 is in a locked position.

The locking mechanism 200 includes a locking finger 202 that engages a latch member 204 affixed to the door 144. The lock finger 202 is retractable (illustrated by arrow 206) to transition the lock 200 to the unlocked position. Once retracted, the user is free to transition the door 144 to the open orientation.

In some electronically actuated lock mechanisms, the lock finger 202 is retracted for a predetermined length of time to give the user adequate time to unlock the lock 200 and then to manipulate door 144. A controller 210 is operably controls actuation of lock finger 202. Retraction of lock finger 202 could be done by a motor, linear actuator, magnetics, etc.

In the illustrated system, a sensor 212 (see FIG. 1) is attached to the door 144. The sensor 212 sends a signal to the controller 210 to actuate the lock finger 202 when a key 214 is placed in sufficient proximity to sensor 212. Sensor 212 and key 214 could include WiFi, Bluetooth, Near Field Communication (NFC) and RFID communications to control the lock 200. Again, other mechanical key arrangements could be implemented. For example, the sensor 212 and key 214 can communicate with one another by any of these protocols. Other sensor and key arrangements such as magnets could be implemented. The key used by the user could include magnets that either move a mechanical component or create a magnetic field that is sensed by the sensor. The sensor 212 can communicate through wires or wirelessly with controller 210.

In some examples, the key 214 could be a sales associate key that includes pre-authorization imbedded technology to access any or in some examples, limited SKU's or number of products of a certain SKU. Thus, the sales associate could access and distribute the product. Further, the key 214, in such an example, could be used for restocking or maintenance activities for the system 100.

In addition to sensor 212, the system may include a kiosk 216, which may be remote from or adjacent the merchandise display system 100. For example, in some examples, the kiosk 216 may be located at an end of an aisle within the retail establishment or in-aisle adjacent the merchandise display system 100.

The kiosk can have a user interface that allows the customer or a sales associate to enter an identification code. Once the code is validated (e.g. by comparison to a database or other standard retailer approval processes), a signal is sent to actuate the lock finger 202. This signal could be direct to the lock finger 202 or could be routed through controller 210.

In another example, the kiosk 216 could include point of sale mechanisms. For instance, the kiosk 216 can include a touch screen 218 or other input device 220 such as a keyboard that allows for selecting the SKU to be purchased. This kiosk 216 can be a self-checkout point of sale station that uses established order processing protocols to request customer to enter payment method. The customer would follow standard prompts to make a selection and then pay for the products selected. Once the payment is approved, the kiosk 216 sends a signal to the system 100 to release the product, e.g. to actuate finger 202. If payment is denied or otherwise not accepted, the system 100 remains locked (e.g. finger 202 is not actuated).

In an alternative configuration, the sales associate uses the point of sale kiosk. The sales associate uses the touch screen 218 or input device 220 to select the desired product. The sales associate enters a pre-assigned sales associate user-code to authorize access to a specific locked product or a batch of products. The kiosk uses standardized retailer processes to validate the sales associate user-code. If the code is approved, a signal is sent to actuate lock finger 202. If the code is not approved, the system remains locked.

The system can be set on a timer to keep the system unlocked (e.g. finger 202 actuated) for a predetermined amount of time. Alternatively, the system could provide a key to the customer to locally unlock the system 100, for example by using the sensor and key arrangement described above.

Further yet, a user could use a mobile app on a mobile device 230 linked to the realer point of sale system. In addition, the mobile app could operably communicate with any or all of kiosk 216, controller 210 or sensor 212. The app would allow for product identification, selection and then payment. The system 100 would recognize an approved purchase and a signal can be sent to actuate finger 202, for example by way of kiosk 216, controller 210, or sensor 212. The app can provide a notice back to the user of an acknowledged purchase and that access has been approved. Here, the customer would then have access to the system and to remove the purchased product.

In addition to allowing a customer use a mobile app, other examples allow a sales associate to use a mobile app. Here, rather than requiring payment, the app would require or have built in the sales associate access code or other information. Once the app approves the sales associate to access the selected product, the app can send a signal directly or through the kiosk 216, controller 210 or sensor 212 to unlock the system 100 (e.g. actuate finger 202).

In a further example, the kiosk 216 includes a bar code reader 231 that can scan bar codes 231 (including linear or matrix style bar codes). The customer could make online or in app purchases using standard purchasing processes. A digital or paper bar code 232 can be generated for the specific purchase. The kiosk 216 can read the generated bar code 232 when presented by the customer. If accepted, the kiosk 216 can send a signal to unlock the system 100. If declined, the system 100 remains locked.

Notably, in the prior examples, if the customer purchases more than the amount of the selected product, the customer would be required to reset the door 144 to the closed orientation to allow unselected product to move into the selected product position. The system 100 can be configured to track the number of times the door 144 is reset and then reopened and correspond that with the amount of product purchased by the customer.

In such a configuration, the system 100 may include sensors that confirm the unselected product transitions to the selected product and the door 144 is again opened before the amount of remaining product the customer can take is reduced. For example, if the customer closes the door 144 and then opens too quickly such that the unselected product is prevented from transitioning to the appropriate location to become selected product, that action is not counted against the total amount of product the customer needs to take from the system 100.

In the illustrated example, the length L1 that the foot 150 extends rearward from the rear side 152 of the front wall 148 to toe 154 is less than the depth D1 of the product 102, 104, 106 displayed in the system 100. This arrangement prevents the foot 154 from engaging unselected product 104 when the door 144 transitions from the closed orientation to the open orientation. Preferably, the length L1 is such that the center of mass of the products 102, 104, 106 is positioned between the rear side 152 of the front wall 148 and the toe 154 such that as the door 144 is pivoted from the closed orientation to the open orientation, the selected product (e.g. product 102 in FIG. 7) will pivot forward with the door 144.

In operation, the user would activate the lock 200 by placing the key 214 (FIG. 1) close enough to sensor 212. This will cause lock finger 202 to retract releasing latch 204 and door 144. As noted above, this can be for a predetermined amount of time.

The user will then grasp door 144 and apply a load to the door 144 to transition the door 144 from the closed orientation (FIG. 1) to the open orientation (FIG. 3). In preferred implementations, this will also pivot the selected product 102 (e.g. first product) of the plurality of products within the product storage area 112.

This manipulation of the door 144 will simultaneously actuate the brake 156 such that it will engage a bottom of a portion of the unselected product, specifically product 104 in the illustrated example. The brake 156 will lift, at least in part, product 104 vertically off of the product support surface 120 and prevent it from moving towards door 144 when the selected product 102 is removed.

The user will remove product 102 from the merchandise display system 100 (FIG. 5).

Thereafter, the user will release the door 144 allowing the door 144 to transition back to the closed orientation. This will also transition the brake 156 back to the release position and release the unselected product 104, 106, as illustrated by arrow 163 in FIG. 10.

With the unselected product 104, 106 released, it will move forward toward and, typically, into abutment with the door 144.

After the predetermined amount of time has occurred, the lock 200 will remain locked such that the key 214 must again be used to unlock the lock 200.

It should be noted that the brake 156, as well as the positioning of the toe 154 when the door 144 is in the open orientation, inhibits sweeping of product 104, 106 from the system 100. Instead, the foot 150 and the brake 156 make it significantly more difficult to remove more than the selected product (e.g. product 102) from the system 100 without repeated unlocking lock 200.

While not illustrated, a cover member can extend over the product storage area 112 to prevent removing product 102, 104, 106 without opening door 144. Typically, the cover member will be in the form of another shelf or a wire rack for storing additional product. Notably, a wire rack is a form of a shelf.

Further, while rollers 122 are illustrated, which allows gravity to easily be used for the biasing force biasing the product toward the front end 114 (e.g. to make the system self-facing), slide mats or other low friction devices could be used. The angle of decline from the rear end 116 to the front end 114 could increase to further assist the self-facing functionality.

Further, in pusher systems, the rollers and slide mats could be implemented to reduce the amount of force required by a pusher to push the product towards the door 144.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A merchandise access system for a retail merchandise display, the merchandise access system comprising:
   a product support structure that defines a product storage area for holding a plurality of product to be dispensed, the product storage area being formed between a front end and rear end of the product support structure;
   a door proximate the front end, the door being transitionable between an open orientation in which selected product of the plurality of product can be removed from the product storage area and a closed orientation in which the plurality of product cannot be removed from the product storage area;
   a brake configured to transition between a braking position in which the brake prevents unselected product of the plurality of product from being moved towards the front end the plurality of product towards the front end and a release position in which the unselected product can move towards the front after the selected product has been removed from the storage area;
   wherein the brake is operably coupled to the door such that as the door transitions from the closed orientation to the open orientation the brake transitions from the release position to the braking position;
   wherein the brake is operably coupled to the door by a mechanical linkage such that a load applied to the door that transitions the door from the closed orientation to the open orientation is used to drive the brake from the release position to the braking position;
   wherein:
      the mechanical linkage has a base member fixed relative to the product support structure, the base member having at least one slot, the slot having a first end and a second end, the first end of the slot is closer to the product support surface than the second end;
      the mechanical linkage has a cam follower that is driven within the slot in a direction extending from the second end toward the first end to transition the brake from the release position to the braking position; and
      the brake has a brake plate that is operably coupled to the cam follower, the cam follower driving the brake plate from being positioned substantially at or below the product support surface when the brake is in the release position to being positioned at a higher position and above the product support surface when the brake is in the braking position.

2. The merchandise access system of claim 1, wherein the product support structure defines a product support surface that supports the plurality of products within the product storage area, the product support surface is gravitationally higher proximate the rear end than proximate the front end of the storage area such that the plurality of product is biased towards the front end by gravity, the brake, when in the braking position, preventing the unselected product from being moved towards the front end due to the force of gravity, the unselected product being movable towards the front end due to gravity when the brake is in the release position.

3. The merchandise access system of claim 1, wherein the brake extends into the product storage area in the braking position and is positioned out of the product storage area in the release position.

4. The merchandise access system of claim 1, wherein:
   the product support structure defines a product support surface that supports the plurality of products;
   a product dispensing axis extends between the front end and rear end, the unselected product of the plurality of products moves towards the front end parallel to the dispensing axis after the selected product is removed from the product storage area;

the door is pivotable about a pivot axis that is generally perpendicular to the product dispensing axis;

the door includes a front wall against which the selected product is biased when the door is in the closed orientation; and the door includes a bottom foot extending rearward from the front wall toward the rear end, the bottom foot being positioned substantially even with or vertically below the product support surface when the door is in the closed orientation, the bottom foot extending upward and at least in part above the product support surface when the door is in the open orientation.

5. The merchandise access system of claim 1, wherein:

the product support structure defines a product support surface that supports the plurality of products;

a product dispensing axis extends between the front end and the rear end, the unselected product of the plurality of products moves towards the front end along the dispensing axis after selected product is removed from the product storage area;

the door is pivotable about a pivot axis that is generally perpendicular to the product dispensing axis;

the door includes a front wall against which the selected product is biased when the door is in the closed orientation; and the door includes a bottom foot extending rearward from the front wall, the bottom foot being positioned relative to the product support surface when the front wall is in the closed orientation such that the foot does not prevent unselected product positioned rearward of the foot from sliding past the rear most extent of the foot toward the front wall when the door is pivoted from the open orientation to the closed orientation after selected product has been removed.

6. The merchandise access system of claim 1, wherein:

the slot is angled relative to a product support surface of the product support structure such that the door is closer to the first end of the slot than the second end of the slot.

7. A merchandise access system for a retail merchandise display, the merchandise access system comprising:

a product support structure that defines a product storage area for holding a plurality of product to be dispensed, the product storage area being formed between a front end and rear end of the product support structure;

a door proximate the front end, the door being transitionable between an open orientation in which selected product of the plurality of product can be removed from the product storage area and a closed orientation in which the plurality of product cannot be removed from the product storage area;

a brake configured to transition between a braking position in which the brake prevents unselected product of the plurality of product from being moved towards the front end the plurality of product towards the front end and a release position in which the unselected product can move towards the front after the selected product has been removed from the storage area;

wherein:

the product support structure defines a product support surface configured to support the plurality of product;

the product support surface has a first portion extending parallel to a product dispensing axis extending between the front end and the rear end;

the product support surface has a second portion extending parallel to the product dispensing axis;

the first and second portions of the product support surface being laterally spaced apart from one another along a transverse axis being perpendicular to the product dispensing axis; and the brake being positioned between the first and second portions of the product support surface.

8. The merchandise access system of claim 7, wherein the brake is operably coupled to the door such that as the door transitions from the closed orientation to the open orientation the brake transitions from the release position to the braking position.

9. The merchandise access system of claim 8, wherein the brake is operably coupled to the door by a mechanical linkage such that a load applied to the door that transitions the door from the closed orientation to the open orientation is used to drive the brake from the release position to the braking position.

10. The merchandise access system of claim 9, wherein the door is biased toward the closed orientation from the open orientation such that the door will automatically transition back to the closed orientation when the load is released from the door while in the open orientation.

11. The merchandise access system of claim 7, wherein the product support structure is configured to bias the plurality of product towards the door.

12. A retail merchandise display, the merchandise display comprising:

a product support structure that defines a product storage area being formed between a front end and rear end of the product support structure;

a door proximate the front end, the door being transitionable between an open orientation in which selected product of the plurality of product can be removed from the product storage area and a closed orientation in which the plurality of product cannot be removed from the product storage area;

a brake configured to transition between a braking position in which the brake prevents unselected product of the plurality of product from being moved towards the front end the plurality of product towards the front end and a release position in which the unselected product can move towards the front after the selected product has been removed from the storage area;

wherein:

the product support structure defines a product support surface that supports the plurality of products;

a product dispensing axis extends between the front end and rear end, the unselected product of the plurality of products moves towards the front end parallel to the dispensing axis after the selected product is removed from the product storage area;

the door is pivotable about a pivot axis that is generally perpendicular to the product dispensing axis;

the door includes a front wall against which the selected product is biased when the door is in the closed orientation; and the door includes a bottom foot extending rearward from the front wall toward the rear end, the bottom foot being positioned substantially even with or vertically below the product support surface when the door is in the closed orientation, the bottom foot extending upward and at least in part above the product support surface when the door is in the open orientation;

a plurality of product positioned within the product storage area to be dispensed, each product of the plurality of product has a product depth measured parallel to the dispensing axis between a front and a rear of the product; and wherein the foot extends rearward from the front wall to a distal end a foot depth measured parallel to the dispensing axis, the foot depth being less than the product depth such that when the front of the product abuts the front wall, the rear of the product is spaced rearward from the front wall farther than the distal end of the foot such that the product extends rearward farther than the foot such that when the door transitions from the closed orientation to the open orientation the foot pivots clear of any product that is abutted against the rear of the product that is abutted against the front wall.

13. A retail merchandise display comprising:
a merchandise access system comprising:
   a product support structure that defines a product storage area being formed between a front end and rear end of the product support structure;
   a door proximate the front end, the door being transitionable between an open orientation in which selected product of the plurality of product can be removed from the product storage area and a closed orientation in which the plurality of product cannot be removed from the product storage area;
   a brake configured to transition between a braking position in which the brake prevents unselected product of the plurality of product from being moved towards the front end the plurality of product towards the front end and a release position in which the unselected product can move towards the front after the selected product has been removed from the storage area;
   wherein:
      the product support structure defines a product support surface that supports the plurality of products;
      a product dispensing axis extends between the front end and rear end, the unselected product of the plurality of products moves towards the front end parallel to the dispensing axis after the selected product is removed from the product storage area;
      the door is pivotable about a pivot axis that is generally perpendicular to the product dispensing axis;
      the door includes a front wall against which the selected product is biased when the door is in the closed orientation; and
      the door includes a bottom foot extending rearward from the front wall toward the rear end, the bottom foot being positioned substantially even with or vertically below the product support surface when the door is in the closed orientation, the bottom foot extending upward and at least in part above the product support surface when the door is in the open orientation;
   a plurality of product positioned within the product storage area, each product of the plurality of product has a product depth measured parallel to the dispensing axis between a front of the product and a rear of the product; and
wherein the foot extends rearward from the front wall to a distal end a foot depth measured parallel to the dispensing axis, the foot depth being less than the product depth such that only one product of the plurality of product may be located in a region of the product storage area vertically above the foot between the distal end and the front wall.

14. The merchandise access system of claim 13, further comprising an electronically actuated lock having a locked position operably acting on the door to prevent the door from transitioning from the closed orientation to the open orientation and unlocked position wherein the door is permitted to transition from the closed orientation to the open orientation.

15. The merchandise access system of claim 14, wherein the electronically actuated lock is configured to permit the door to transition from the open orientation to the closed orientation when the electronically actuated lock is in the locked position.

16. The merchandise access system of claim 14, wherein the electronically actuated lock cooperates directly with a latch member fixedly attached to the door.

17. The merchandise access system of claim 14, further comprising a sensor that sends a signal to unlock the electronically actuated lock when access to the selected product is authorized.

18. The merchandise access system of claim 17, wherein the sensor is an RFID sensor.

19. The merchandise access system of claim 14, further comprising a kiosk operably coupled to the electronically actuated lock, the kiosk configured to actuate, operably, the electronically actuated lock to the unlocked position when the kiosk receives an authorized access code.

20. The merchandise access system of claim 19, wherein the kiosk sends a signal to a controller of the electronically actuated lock to actuate the electronically actuated lock.

21. The merchandise access system of claim 19, wherein the kiosk is configured to process payment information from a customer and then to actuate, operably, the electronically actuated lock when the payment information has been accepted.

22. The merchandise access system of claim 19, wherein the kiosk includes a bar code reader and the access code is in the form of a bar code.

23. The merchandise access system of claim 14, wherein the electronically actuated lock can be actuated to the unlocked position using an app on a mobile device.

24. The merchandise access system of claim 14, wherein the electronically actuated lock can be actuated using near field communication (NFC).

25. The merchandise access system of claim 13, wherein the product support structure defines a product support surface, the product support surface being defined by a plurality of rollers.

26. The merchandise access system of claim 13, wherein the center of gravity of each product is located between the front wall and the distal end of the foot when the product is proximate the front wall such that when the product pivots with the door when the door pivots from the closed orientation to the open orientation.

27. The merchandise access system of claim 13, wherein a biasing force acts on the plurality of products, when in the braking position, the brake prevents unselected product from moving towards the front end due to the biasing force and, when the brake is in the release position, the unselected product can move towards the front end due to the biasing force after the selected product has been removed from the storage area.

28. A method of removing selected product from a plurality of product stored within a merchandise access system, the method comprising:

transitioning a door of the merchandise access system to an open orientation in which selected product of the plurality of product can be removed from a product storage area of the merchandise access system, the product storage configured for holding a plurality of product to be dispensed, the product storage area being defined by a product support structure and being defined formed between a front end and rear end of the product support structure, the door being door being transitionable between the open orientation and a closed orientation in which the plurality of product cannot be removed from the product storage area;

removing the selected product from the product storage area; and preventing the unselected product of the plurality of product from being moved towards the front end by transitioning a brake of the merchandise access system to a braking position in which the brake prevents unselected product of the plurality of product from being moved towards the front end the plurality of product towards the front end, the brake configured to transition between the braking position and a release position in which the unselected product can move towards the front after the selected product has been removed from the storage area biasing the plurality of product towards the front end with a biasing force;

the brake preventing the unselected product from moving towards the front end due to the biasing force when the brake is in the braking position;

transitioning the door from the open orientation to the closed orientation; and indexing the unselected product towards the front end due to the biasing force by transitioning the brake to the release position;

wherein:
    the step of preventing the unselected product includes vertically lifting at least a portion of a bottom of at least one product of the unselected product off of the product support structure; and the step of indexing the unselected product to move towards the front end includes vertically releasing the vertically lifted product such that is disengaged from the brake.

29. The method of claim 28, further comprising:
actuating an electronically actuated lock from a locked position preventing the door from transitioning from the closed orientation to the open orientation to an unlocked position wherein the door is permitted to transition from the closed orientation to the open orientation.

30. The method of claim 29, further comprising:
receiving an access authorization code and then performing the step of actuating the electronically actuated lock from the locked position to the unlocked position.

31. The method of claim 30, wherein the access authorization code is received by a kiosk that is at a remote location.

32. The method of claim 30, further comprising:
receiving an access authorization signal and then performing the step of actuating the electronically actuated lock from the locked position to the unlocked position.

33. The method of claim 32, wherein the access authorization signal is received by a sensor sensing a key in proximity of the sensor.

34. The method of claim 33, wherein the sensor is an RFID sensor and the key is an RFID key.

35. The method of claim 29, further comprising:
receiving payment information and then performing the step of actuating the electronically actuated lock from the locked position to the unlocked position.

36. The method of claim 29, further comprising:
returning the door to the closed orientation;
allowing unselected product to transition into being selected product; and
transitioning the door, for a second time, to the open orientation while the electronically actuated lock remains in the unlocked position.

\* \* \* \* \*